United States Patent
Kim

(10) Patent No.: US 10,926,764 B2
(45) Date of Patent: Feb. 23, 2021

(54) LANE KEEPING ASSISTANCE APPARATUS, VEHICLE HAVING THE SAME AND METHOD FOR CONTROLLING THE SAME

(71) Applicant: MANDO CORPORATION, Pyeongtaek-si (KR)

(72) Inventor: Heong-Tae Kim, Yongin-si (KR)

(73) Assignee: MANDO CORPORATION, Pyeongtaek-si (KR)

(*) Notice: Subject to any disclaimer, the term of this patent is extended or adjusted under 35 U.S.C. 154(b) by 0 days.

(21) Appl. No.: 16/788,930

(22) Filed: Feb. 12, 2020

(65) Prior Publication Data
US 2020/0255008 A1 Aug. 13, 2020

(30) Foreign Application Priority Data
Feb. 12, 2019 (KR) .......................... 10-2019-0015864

(51) Int. Cl.
*A01B 69/00* (2006.01)
*B62D 6/00* (2006.01)
(Continued)

(52) U.S. Cl.
CPC ............ *B60W 30/12* (2013.01); *B60K 35/00* (2013.01); *B60W 10/20* (2013.01); *B60W 50/14* (2013.01);
(Continued)

(58) Field of Classification Search
CPC ...... B60W 30/12; B60W 10/20; B60W 50/14; B60W 2050/143; B60W 2050/146; B60K 35/00; B62D 1/28; G06K 9/00798
See application file for complete search history.

(56) References Cited

U.S. PATENT DOCUMENTS

2019/0184990 A1* 6/2019 Lee ..................... B60W 30/143
2020/0064855 A1* 2/2020 Ji ............................... B60R 1/00

FOREIGN PATENT DOCUMENTS

JP          2010-271999 A     12/2010
KR    10-2010-0104495 A      9/2010
(Continued)

OTHER PUBLICATIONS

Notice of Allowance issued in Korean Patent Application No. 10-2019-0015864, dated Sep. 25, 2019 (English Translation).

*Primary Examiner* — Harry Y Oh
(74) *Attorney, Agent, or Firm* — Morgan, Lewis & Bockius LLP

(57) ABSTRACT

Provided is a vehicle capable of: acquiring an image of a road in front of a vehicle in an autonomous driving mode; recognizing a lane line, a subject lane, and an obstacle on the acquired image of the road; determining whether the recognized obstacle is in a stationary state based on obstacle information detected by an obstacle detector; acquiring, if the obstacle in the stationary state exists on at least one of two subject lane lines constituting the subject lane, a width of involvement of the lane line crossed by the obstacle; determining whether keeping of travelling on the subject lane is to be performed based on the acquired width of involvement; performing a deflection control within the subject lane to avoid the obstacle in the stationary state if it is determined that the keeping of travelling on the subject lane is to be performed; and performing control of departure from the subject lane or deceleration control if it is determined that the keeping of travelling on the subject lane is not to be performed.

15 Claims, 17 Drawing Sheets

(51) Int. Cl.
  *B62D 11/00*  (2006.01)
  *B62D 12/00*  (2006.01)
  *B63G 8/20*  (2006.01)
  *B63H 25/04*  (2006.01)
  *G05D 1/00*  (2006.01)
  *G06F 7/00*  (2006.01)
  *G06F 17/00*  (2019.01)
  *B60W 30/12*  (2020.01)
  *B60K 35/00*  (2006.01)
  *B60W 10/20*  (2006.01)
  *B60W 50/14*  (2020.01)
  *B62D 1/28*  (2006.01)
  *G06K 9/00*  (2006.01)

(52) U.S. Cl.
  CPC ........... *B62D 1/28* (2013.01); *G06K 9/00798* (2013.01); *B60W 2050/143* (2013.01); *B60W 2050/146* (2013.01)

(56) References Cited

FOREIGN PATENT DOCUMENTS

KR   10-1502511 B1   3/2015
KR   10-2017-0049253 A   5/2017

\* cited by examiner (a) (b)

(a)  (b)

(a)          (b)

LANE KEEPING ASSISTANCE APPARATUS, VEHICLE HAVING THE SAME AND METHOD FOR CONTROLLING THE SAME

CROSS-REFERENCE TO RELATED APPLICATION

This application is based on and claims priority under 35 U.S.C. § 119 to Korean Patent Application No. 10-2019-0015864, filed on Feb. 12, 2019 in the Korean Intellectual Property Office, the disclosure of which is incorporated herein by reference.

BACKGROUND

1. Field

The present disclosure relates to a lane keeping assistance apparatus, vehicle having the same and method for controlling the same for recognizing a lane line of a lane and maintaining a lane being driven based on the recognized lane.

2. Description of the Related Art

Recently, there have been development on various types of advanced driver assistance system (ADAS) that are designed to inform a driver of travelling information of a vehicle to prevent an accident from occurring due to driver's carelessness and perform autonomous driving for driver's convenience.

Among such driving assistance systems, using a vision sensor, an autonomous Emergency Braking (AEB), Blind Spot Detection (BSD), and Lane Keeping Assistance apparatus (LKAS) are used.

Among these, the lane keeping system (LKAS) acquires an image of a road ahead from a camera attached to the vehicle, recognizes a lane adjacent to the currently driving lane from the acquired image, and then emits a warning sound or guide sound when the vehicle leaves the lane. By outputting it, it is possible to prevent accidents due to lane departure from driving lanes.

Such a lane keeping system needs to accurately recognize a lane on a road to accurately determine a lane departure of a vehicle for lane keeping and lane departure preventing operation.

However, there was a problem that fail to recognize the lane in the image, when the lane keeping system recognizes lanes because being blocked by the shadow or backlight of the obstacles such that another vehicle running in front of the vehicle, guard rails to obtain an image without a lane, or being damaged the actual lane without the lane is obtained.

As a result, the accuracy of the lane departure warning and the lane keeping operation is low, and the lane departure warning and the lane keeping operation are not performed, thereby reducing the reliability of the lane keeping system.

SUMMARY

One aspect provides a lane keeping apparatus for generating a virtual lane based on a predetermined distance, a vehicle having the same, and a control method thereof.

Another aspect provides a lane keeping device, a vehicle having the same, and a method of controlling the same, which adjust the position of the lane based on the distance from the object.

In accordance with one aspect of the present disclosure, a lane keeping assistance apparatus includes an image acquirer configured to acquire an image of a road; and a controller configured to recognize lane lines and objects of a road based on the image acquired by the image acquirer, recognize driving lane based on the recognized lane lines, generate the other lane line based on a preset lane width when only one lane line of the recognized lane is recognized, adjust the position of the generated one lane line based on the preset distance when a distance between the recognized object and the generated one lane line is equal to or less than a reference distance, and perform at least one of lane departure prevention control and lane keeping control based on the adjusted position of the lane line and the recognized position of the lane line, wherein the controller may maintain the position of the generated one lane line when the distance between the recognized object and the generated one lane line is more than the reference distance, and may perform at least one of the lane departure prevention control and lane keeping control based on the position of the generated one lane line and the recognized lane line.

The controller may adjust the position of the recognized one lane line based on the preset distance when the distance between the recognized object and the recognized one lane line is equal to or less than the reference distance, and may maintain the position of the position of the recognized one lane line based on the preset distance when the distance between the recognized object and the recognized one lane line is more than the reference distance.

The controller, when adjusting the position of the recognized lane line or the generated lane line, may move the lane line to the left for position adjustment by the preset distance if the recognized object exists on right side of the recognized lane line, and may move the lane line to the right for position adjustment by the preset distance if the recognized object exists on left side of the recognized lane line.

The controller may maintain the position of the recognized lane lines when both lane lines of the recognized lane are recognized.

The controller may acquire a distance between the recognized object and the both lane lines respectively, and may adjust the position of the lane line that is less than or equal to the reference distance among the acquired distances.

The controller, when adjusting the position of the lane line that is less than or equal to the reference distance, may move the lane line to the left by the preset distance if the recognized object exists on right side of the recognized lane line, and may move the lane line to the right by the preset distance if the recognized object exists on left side of the recognized lane line.

In accordance with another aspect of the present disclosure, a vehicle includes: an image acquirer configured to acquire an image of a road; and a controller configured to recognize both lane lines of a driving lane and objects based on the image acquired by the image acquirer, and perform at least one of lane departure prevention control and lane keeping control based on position of the recognized both lane lines and objects, wherein the controller may generate the other lane line based on a preset lane width when only one lane line of the recognized lane is recognized, adjust the position of the generated one lane line based on the preset distance when a distance between the recognized object and the generated one lane line is equal to or less than a reference distance, may maintain the position of the generated one lane line when the distance between the recognized object and the generated one lane line is more than the reference distance, may acquire a distance between the recognized object and the both lane lines respectively, and may adjust the position of the lane line that is less than or equal to the reference distance among the acquired distances, and may maintain the position of the both lane lines when the acquired distances both are more than the reference distance.

The controller, when adjusting the position of the generated lane line, may move the generated lane line to the left by the preset distance if the recognized object exists on right side of the generated lane line, and may move the generated lane line to the right by the preset distance if the recognized object exists on left side of the generated lane line.

The controller may generate the other lane line based on a preset lane width when only one lane line of lane is recognized, and may perform at least one of lane departure prevention control and lane keeping control based on the position of the generated one lane line and the recognized one lane line.

The vehicle may further include a sound outputter configured to output a warning sound when one of the both lane lines of the lane deviates the lane in response to a control command of the controller.

The vehicle may further include a display configured to turn on a warning light when one of the both lanes of the lane lines deviates the lane in response to a control command of the controller.

The vehicle may further include a steering device configured to control a driving direction to drive in the lane in response to a control command of the controller.

In accordance with another aspect of the present disclosure, a method for controlling a lane keeping assistance apparatus, the method includes acquiring an image of a road; recognizing lane lines and objects of a road based on the acquired image; recognize driving lane based on the recognized lane lines; generating the other lane line based on a preset lane width when only one lane line of the recognized lane is recognized; adjusting the position of the generated one lane line based on the preset distance when a distance between the recognized object and the generated one lane line is equal to or less than a reference distance, performing at least one of lane departure prevention control and lane keeping control based on the adjusted position of the lane line and the recognized position of the lane line; maintaining the position of the generated one lane line when the distance between the recognized object and the generated one lane line is more than the reference distance; and performing at least one of the lane departure prevention control and lane keeping control based on the position of the maintained one lane line and the recognized lane line.

The method may further include adjusting the position of the recognized one lane line based on the preset distance when the distance between the recognized object and the recognized one lane line is equal to or less than the reference distance; and maintaining the position of the position of the recognized one lane line based on the preset distance when the distance between the recognized object and the recognized one lane line is more than the reference distance.

The method may further include recognizing the object on the left side when the recognized lane is the primary lane; adjusting the position of the center line by a preset distance to the right when the distance between the recognized object and the center line is less than or equal to the reference distance; recognizing the object on the right side when the recognized lane is the last lane on the right side; adjusting the right lane to the left by the predetermined distance when the distance between the recognized object and the right lane is less than the reference distance to adjust.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
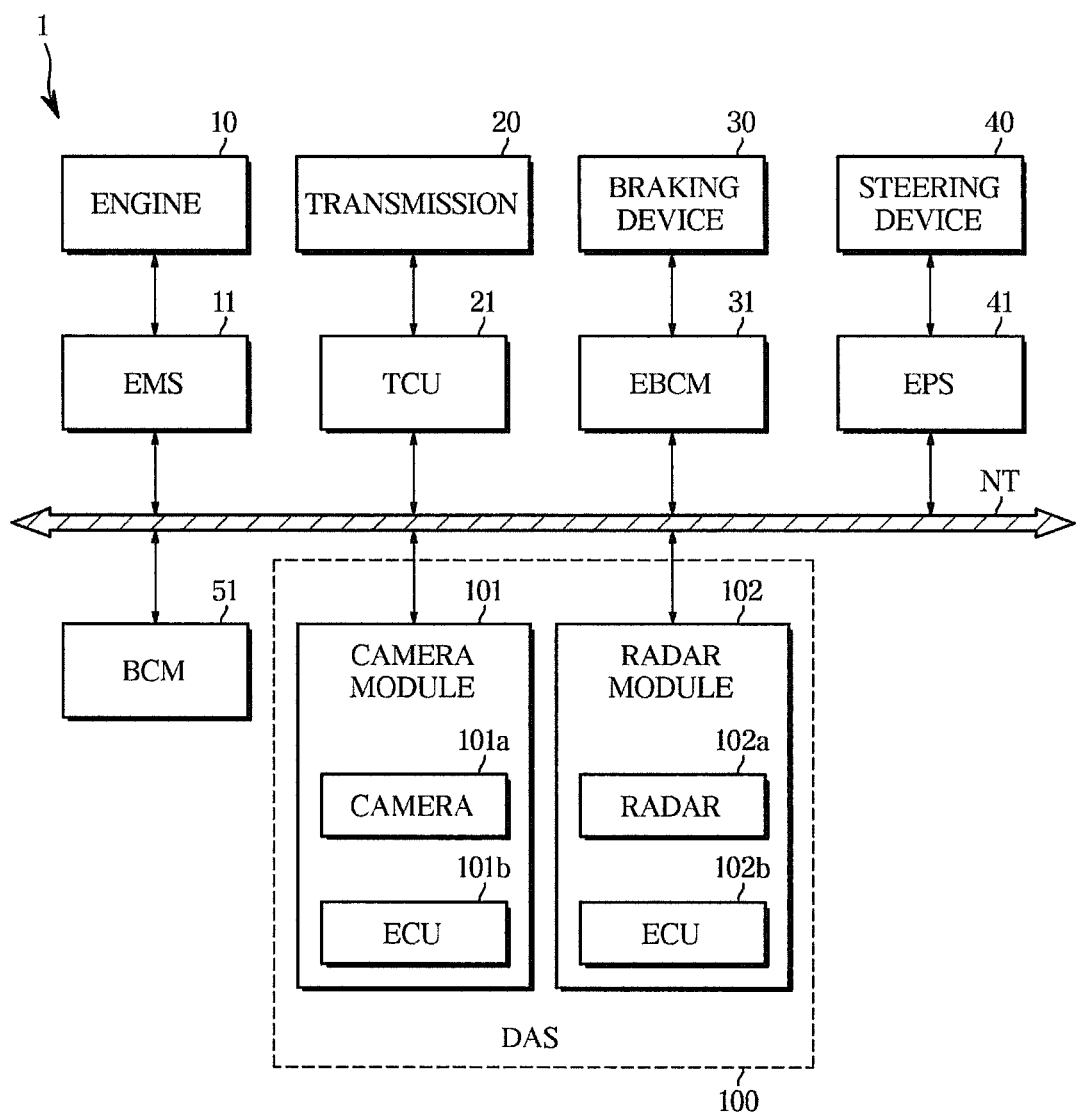
FIG. 1 is a block diagram illustrating a vehicle according to an embodiment.

Like numerals refer to like elements throughout the specification. Not all elements of embodiments of the present disclosure will be described, and description of what are commonly known in the art or what overlap each other in the embodiments will be omitted.

The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components, but are used only for the purpose of distinguishing one component from another component.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present disclosure will be described with reference to the accompanying drawings.

FIG. 1 is a block diagram illustrating a vehicle according to an embodiment.

Referring to FIG. 1, the vehicle 1 includes an engine 10, a transmission 20, a braking device 30, and a steering device 40.

The engine 10 may include a cylinder and a piston, and generate power for the vehicle 1 to travel.

The transmission 20 may include a plurality of gears, and transmit power generated by the engine 10 to wheels.

The braking device 30 may decelerate the vehicle 1 or stop the vehicle 1 through friction with the wheels.

The steering device 40 may change the travelling direction of the vehicle 1.

The vehicle 1 may include a plurality of electrical components.

For example, the vehicle 1 further includes an engine management system (EMS) 11, a transmission control unit (TCU) 21, and an electronic brake control module (EBCM) 31), an electronic power steering (EPS) 41, a body control module (BCM), and an advanced driver assistance system (ADAS).

The EMS 11 may control the engine 10 in response to acceleration intent of a driver through an accelerator pedal or a request of an advanced driver assistance system (ADAS) 100. For example, the EMS 11 may control the torque of the engine 10.

The TCU 21 may control the transmission 20 in response to a shift command of the driver through a shift lever and/or a travelling velocity of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS). The EBCM 31 may selectively release braking of the vehicle wheel in response to over-steering and/or under-steering sensed at a time of steering of the vehicle 1 (electronic stability control, ESC). In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The ADAS 100 may assist the driver in manipulating (driving, braking, steering) the vehicle 1. For example, the ADAS 100 may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The ADAS 100 may provide the driver with various functions. For example, the DAS 60 may provide a lane departure warning (LDW), a lane keeping assist (LKA), a high beam assist (HBA), an autonomous emergency braking (AEB), a traffic sign recognition (TSR), a smart cruise control (SCC), a blind spot detection (BSD), and the like.

The ADAS 100 may include a camera module 101 for acquiring image data around the vehicle 1 and a radar module 102 for acquiring obstacle data around the vehicle 1.

The camera module 101 may include a camera 101a and an electronic control unit (ECU) 101b, and may photograph the front of the vehicle 1 and recognize other vehicles, pedestrians, cyclists, lanes, road signs, and the like.

The radar module 102 may include a radar 102a and an electronic control unit (ECU) 102b and may acquire relative positions and relative velocities of obstacles (e.g., other vehicles, pedestrians, cyclists, and the like) around the vehicle 1.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like.

Figure 2:
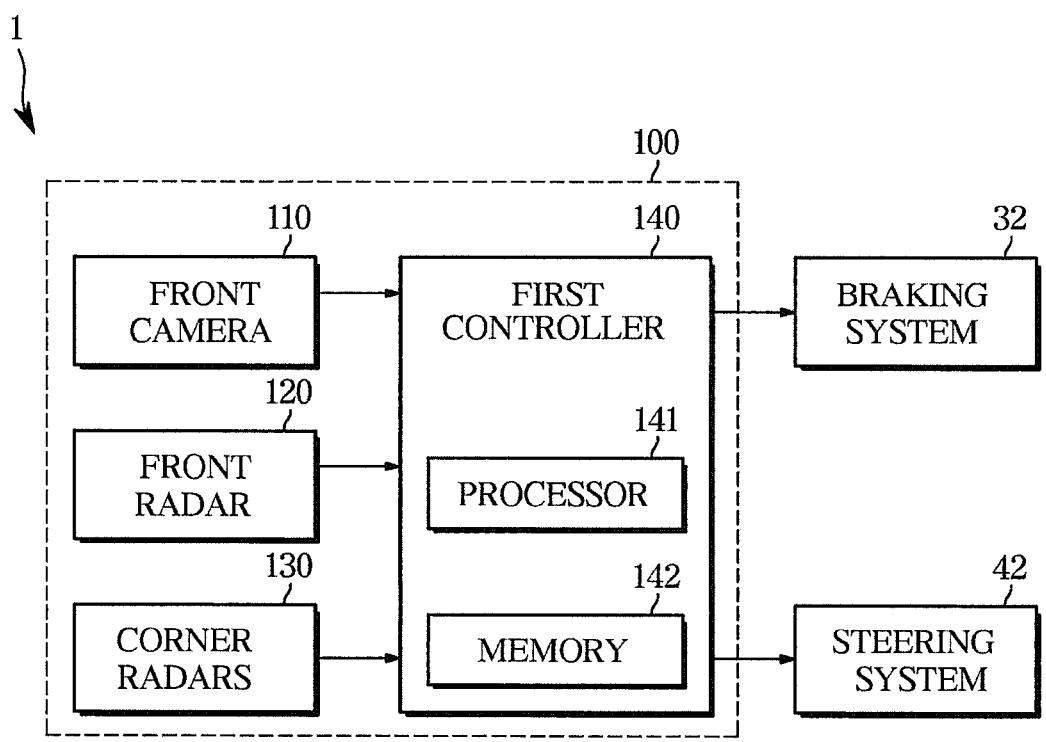
FIG. 2 is a block diagram illustrating an advanced driver assistance system (ADAS) provided in a vehicle according to an embodiment.
Figure 3:
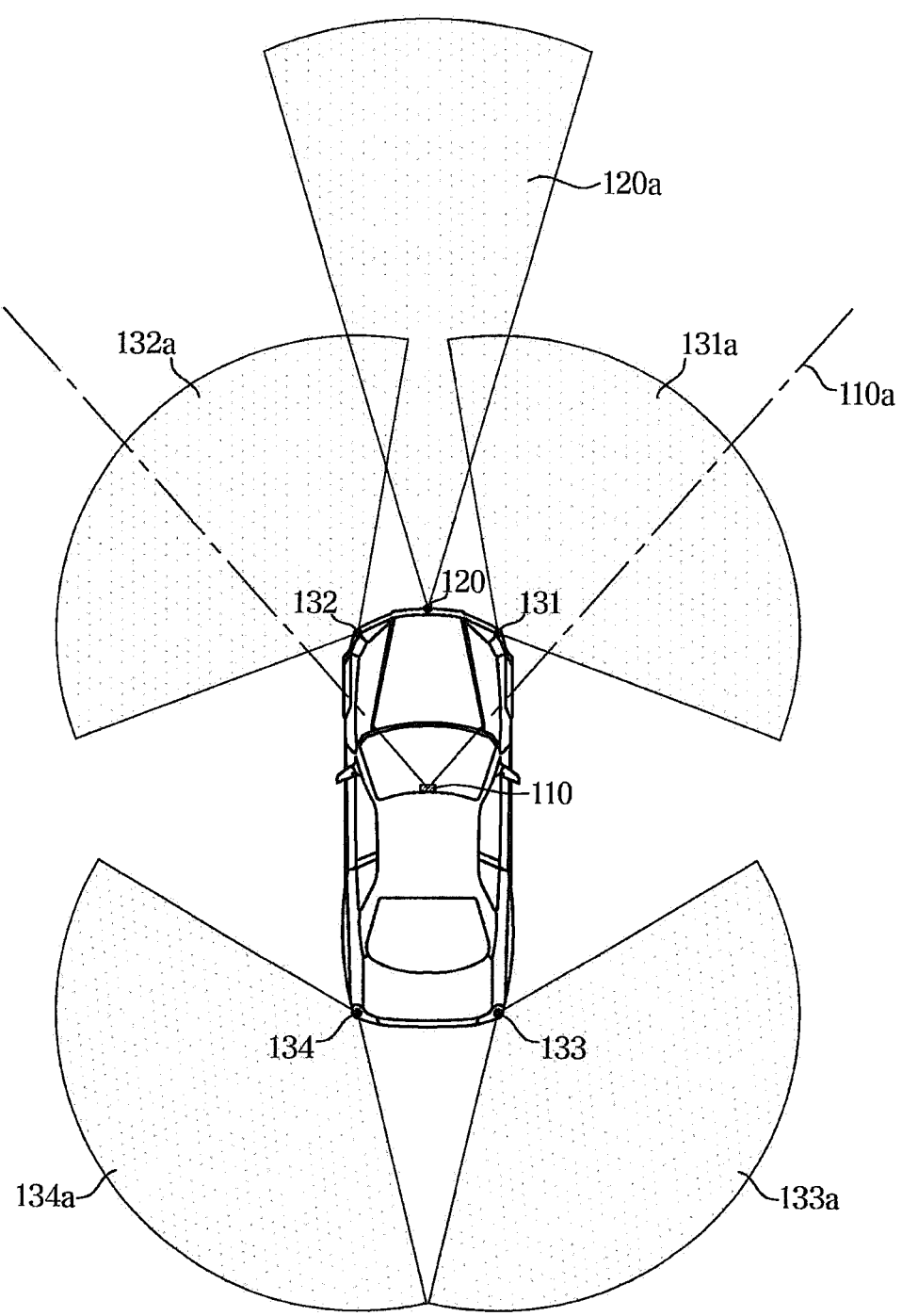
FIG. 3 is a diagram illustrating an example of a detection area of a camera and a radar included in an ADAS of a vehicle according to an embodiment.

FIG. 2 is a block diagram illustrating an ADAS provided in a vehicle according to an embodiment, and FIG. 3 is a diagram illustrating an example of a detection area of a camera and a radar included in an ADAS of a vehicle according to an embodiment.

Referring to FIG. 2, the vehicle 1 may include a braking system 32, a steering system 42, and a ADAS 100.

The braking system 32 according to the embodiment may include the EBCM (31 in FIG. 1) and the braking device (30 in FIG. 1) described in conjunction with FIG. 1, and the steering system 42 may include the EPS (41 in FIG. 1) and the steering device (40 in FIG. 1).

The ADAS 100 according to the embodiment may include a front camera 110, a front radar 120, and the plurality of corner radars 130.

As shown in FIG. 3, the front camera 110 may have a field of view 110a facing forward of the vehicle 1. The front camera 110 may be installed, for example, in the front windshield of the vehicle 1.

The front camera 110 may photograph the front of the vehicle 1 and acquire image data regarding the front of the vehicle 1. The image data regarding the front of the vehicle 1 may include position information of at least one of another vehicle, a pedestrian, a cyclist, a lane, a curb, a guard rail, a roadside tree, a street lamp, or the like existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a first controller 140. For example, the front camera 110 may be connected to the first controller 140 through a vehicle communication network NT, through a hard wire, or through a printed circuit board (PCB).

The front camera 110 may transmit the image data of the front of the vehicle 1 to the first controller 140.

As shown in FIG. 3, the front radar 120 may have a field of sensing 120a directed to the front of the vehicle 1. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an obstacle.

The front radar 120 may acquire front radar data from the transmission radio waves transmitted by the transmission antenna and the reflection radio waves received by the reception antenna.

Front radar data may include position information and velocity information regarding an obstacle, such as another vehicle, a pedestrian, or a cyclist existing in front of the vehicle 1.

The front radar 120 may calculate the relative distance to the obstacle based on the phase difference (or time difference) between the transmission radio waves and the reflection radio waves, and calculate the relative velocity of the object based on the frequency difference between the transmission radio waves and the reflected radio waves.

The front radar 120 may be connected to the first controller 140 through a vehicle communication network NT, a hard wire, or a printed circuit board. The front radar 120 may transmit the front radar data to the first controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

As shown in FIG. 3, the first corner radar 131 may have a field of sensing 131a directed to the front right side of the vehicle 1. The first corner radar 131 may be installed on the right side of a front bumper of the vehicle 1. The second corner radar 132 may have a field of sensing 132a directed to the front left side of the vehicle 1, and may be installed on the left side of the front bumper of the vehicle 1. The third corner radar 133 may have a field of sensing 133a directed to the rear right side of the vehicle 1 and may be installed on the right side of a rear bumper of the vehicle 1. The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna.

The first, second, third, and fourth corner radars 131, 132, 133 and 134 acquire first corner radar data, second corner radar data, third corner radar data, and fourth corner radar data, respectively.

The first corner radar data may include distance information and velocity information regarding another vehicle, a pedestrian or a cyclist (hereinafter, referred to as "an obstacle") existing on the front right side of the vehicle 1. The second corner radar data may include distance information and velocity information regarding an obstacle existing on the front left side of the vehicle 1. The third and fourth corner radar data may respectively include distance and velocity information regarding an obstacle existing on the rear right side of the vehicle 1 and distance and velocity information regarding an object located on the rear left side of the vehicle 1, respectively.

Each of the first, second, third, and fourth corner radars 131, 132, 133 and 134 may be connected to the first controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the first controller 140.

The first controller 140 may include the ECU (101b in FIG. 1) of the camera module (101 in FIG. 1) and/or the ECU (102b in FIG. 1) of the radar module (102 in FIG. 1), and/or an integrated ECU.

The first controller 140 includes a processor 141 and a memory 142.

The processor 141 may process the front image data of the front camera 110, the front radar data of the front radar 120, and the corner radar data of the plurality of corner radars 130, and generate a braking signal and a steering signal for controlling the braking system 32 and the steering system 42.

For example, the processor 141 may include an image signal processor for processing the front image data of the front camera 110 and/or a digital signal processor for processing radar data of the radars 120 and 130 and/or a micro control unit (MCU) for generating a braking signal and/or a steering signal.

The processor 141 may detect obstacles (e.g., another vehicle, a pedestrian, a cyclist, a curb, a guard rail, a roadside tree, a street lamp, and the like) in front of the vehicle 1 based on the front image data of the front camera 110 and the front radar data of the radar 120.

In detail, the processor 141 may acquire position information (distance and direction) and velocity information (relative velocity) of the obstacles in front of the vehicle 1 based on the front radar data of the front radar 120. The processor 141 may acquire position information (direction) and type information (for example, whether the obstacle is another vehicle, a pedestrian, a cyclist, a cub, a guard rail, a roadside tree, a street lamp, or the like) of the obstacle existing in front of the vehicle 1 based on the front image data of the front camera 110.

In addition, the processor 141 may match the obstacles detected by the front image data with the obstacles detected by the front radar data, and acquire the type information, the position information, and the velocity information of the obstacles in front of the vehicle 1 based on a result of the matching.

The processor 141 may generate a braking signal and a steering signal based on the type information, the position information, and the velocity information of the front obstacles.

For example, the processor 141 calculates a time to collision (TTC) between the vehicle 1 and the front obstacle based on the position information (relative distance) and the velocity information (relative velocity) of the front objects, and warns the driver of a collision, transmits a braking signal to the braking system 32, or transmits a steering signal to the steering system 42 based on a result of comparing the TTC with a predetermined reference time.

In response to the TTC less than a predetermined first reference time, the processor 141 may allow an alert to be output via audio and/or display.

In response to the TTC less than a predetermined second reference time, the processor 141 may transmit a preliminary-braking signal to the braking system 32.

In response to the TTC less than a predetermined third reference time, the processor 141 may transmit an emergency braking signal to the braking system 32. In this case, the second reference time is shorter than the first reference time, and the third reference time is shorter than the second reference time.

As another example, the processor 141 may calculate a distance to collision (DTC) based on the velocity information (relative velocity) of front objects, and warn the driver of a collision or transmit a braking signal to the braking system 32 based on a result of comparing the DTC with distances to the front objects.

The processor 141 may acquire position information (distance and direction) and velocity information (relative velocity) of the obstacles on the sides of the vehicle 1 (front right, front left, rear right, and rear left) based on corner radar data of the plurality of corner radars 130.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

Figure 4:
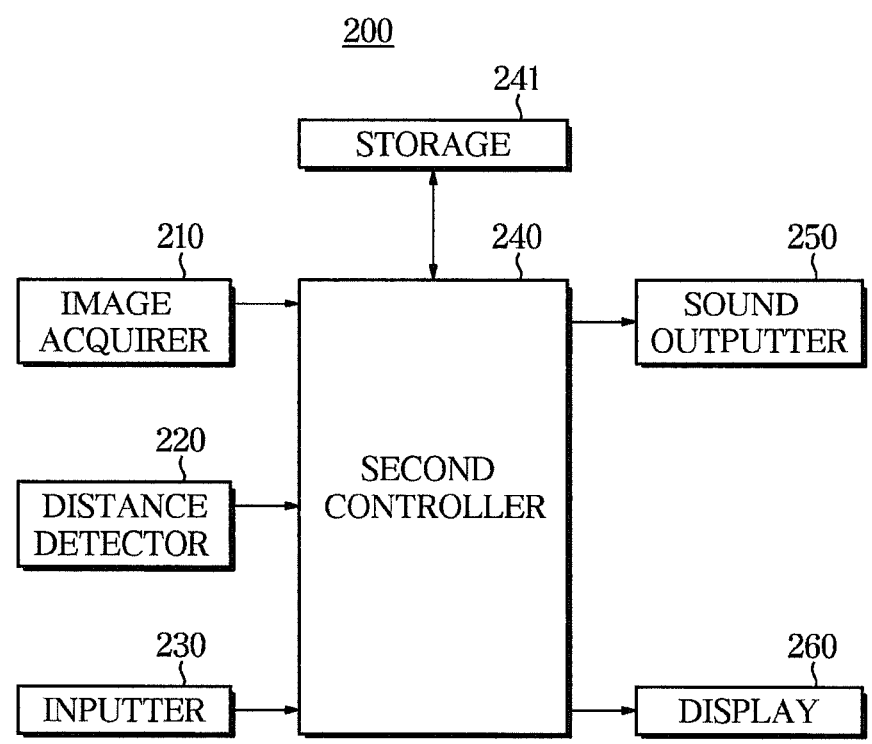
FIG. 4 is a block diagram illustrating a lane keeping assistance apparatus provided in a vehicle according to an embodiment.

FIG. 4 is a block diagram illustrating a lane keeping assistance apparatus 200 provided in a vehicle according to an embodiment.

The lane keeping assistance apparatus 200 of the ADAS 100 may include an image acquirer 210, a distance detector 220, an inputter 230, a second controller 240, a storage 241, a sound outputter 250, and a display 260.

The image acquirer 210 acquires an image of a road and transmits information about the acquired image to the second controller 240. The information about the image may be image data.

The image acquirer 210 may include the front camera 110, and may acquire image information of the road and acquire front image data photographed by the front camera 110.

The distance detector 220 detects obstacles on the front side and the left and right sides of a host vehicle, and transmits obstacle information about the detected obstacles to the second controller 240

The obstacle detector 220 may include the front radar 120 and the first and second corner radars 131 and 132.

In addition, the obstacle detector 220 may include a LiDAR sensor.

A light detection and ranging (LiDAR) sensor is a non-contact distance detection sensor using the laser radar principle.

The LiDAR sensor may include a transmitter for transmitting a laser and a receiver for receiving a laser, which is reflected from a surface of an object existing within a sensor range and then is returned.

The laser may be a single laser pulse.

For reference, since the LiDAR sensor has a higher accuracy in lateral direction detection when compared to a radar detecting and ranging (RaDAR) sensor, the use of the LiDAR sense may increase the accuracy of determining whether a passage exists in the front area.

The distance detector 220 may include an ultrasonic sensor.

The ultrasonic sensor generates ultrasonic waves for a predetermined period of time and detects a signal, which is reflected by an object and then is returned. Such an ultrasonic sensor may be used to determine the presence or absence of an obstacle, such as a pedestrian, in a short range.

The inputter 230 may receive an on-off command of the vehicle maintenance mode.

The inputter 230 may also receive an on-off command of an operation mode associated with the vehicle maintenance mode. For example, the operation mode associated with the lane keeping mode may include an autonomous driving mode.

The inputter 230 may receive a warning sound for lane departure among a plurality of warning sounds.

When the image information of the road is received, the second controller 240 recognizes the lane of the road by performing image processing, recognizes the own lane on which the own vehicle travels based on the location information of the recognized lane, and recognizes both lane lines of the own lane. If it is determined that both lane lines are recognized, the vehicle maintain mode is performed based on the recognized lane.

If it is determined that one lane line of both lane lines of the own lane is unrecognized, the second controller 240 generates a virtual lane line for the unrecognized lane line based on the average lane width.

That is, when it is determined that only one lane line of both lane lines of the own lane is recognized, the second controller 240 generates a virtual lane line for the unrecognized lane line based on the preset lane width.

Here, the preset lane width may be an average lane width of a general road, an average lane width corresponding to road information of a road where the vehicle is currently located, or may be an average lane width obtained while driving a vehicle.

That is, the second controller 240 may acquire the lane width of the own lane based on the image information of the road while driving and obtain the average lane width of the obtained lane width. When obtaining the average lane width, the second controller 240 may periodically acquire the lane width and obtain the average lane width with respect to the preset number of lane widths among the recently obtained lane widths.

The second controller 240 may acquire road information based on the location of the current vehicle received by the GPS receiver (not shown), and obtain an average lane width corresponding to the obtained road information.

The second controller 240 determines whether the object exists in at least one of a left direction and a right direction of the own lane based on the received detection information when the second controller 240 receives the detection information, and checks the distance to the object when it is determined than the object exists in at least one of the left direction and the right direction, and determines whether the position adjustment of at least one lane of both lanes is necessary when it is determined that the distance to the object is checked, and based on the distance to the identified object, and adjusts the position of the at least one lane based on a preset distance when it is determined that the position adjustment of at least one lane is necessary, the position of the at least one lane is adjusted based on a preset distance, and maintains the positions of both lanes when it is determined that it is unnecessary.

The second controller 240 maintains the positions of both lane lines when it is determined that no object exists in both the left and right directions of the own lane.

The lane line whose position is adjusted when adjusting the position of the lane line based on the presence or absence of an object may be an actual lane line corresponding to lane recognition or a virtual lane line corresponding to lane recognition.

In this case, the object may include a curb or a guard rail, or may include a street light or a roadside tree.

When adjusting the position of the lane line, the second controller 240 adjusts the position of the lane line corresponding to the direction in which the object exists.

When adjusting the position of the lane line, the second controller 240 adjusts the position of the lane line based on a predetermined distance. That is, when the position of the left lane line of the own lane is adjusted, the second controller 240 moves the position of the left lane line to the right by a predetermined distance, and when adjusting the position of the right lane line of the own lane, the position of the lane is adjusted by moving the position of the right lane line to the left by a predetermined distance.

The second controller 240 may adjust the position of the left lane line of the own lane or the position of the right lane line of the own lane when the own lane is determined to be the first lane, or when the own lane is determined to be the last right lane.

The second controller 240 may control the display unit 260 to display the recognized two lane lines as the top view image.

In this case, the lane keeping mode may include determining which lane line of the lane lines of the own lane the vehicle has deviated and outputting a warning sound or turning on a warning light when it is determined that the vehicle has deviated the lane.

In addition, performing the lane keeping mode may include controlling the driving of the vehicle so that the vehicle runs in the own lane.

The second controller 240 may transmit lane departure information to the braking system and the steering system.

Here, the steering system adjusts the driving direction based on the recognized position of the lane so that the position of the own vehicle becomes the driving lane.

The braking system may brake when it is determined that an obstacle exists in the lane departure direction based on the lane departure direction and the detection of the obstacle when the lane departure occurs.

Here, the second controller 240 of the lane keeping apparatus may be the same as or different from the first controller 140 of the driver assistance system.

The storage 241 may store a predetermined lane width and store a preset distance and a reference distance for lane adjustment.

Here, the predetermined lane width, the preset distance, and the reference distance may be information obtained by experiments, respectively.

In addition, the average lane width is the average lane width of the lane on the road on which the own vehicle is driving, and may be average distance information between both lanes periodically recognized while the vehicle is driving.

The storage 241 may store the lane width obtained periodically while driving.

The storage 241 may store road location information and an average lane width for each road location information.

The storage 241 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the storage 241 is not limited thereto.

The storage 241 may be a memory implemented as a separate chip from the processor described above with respect to the second controller 240, or may be implemented as a single chip with the processor.

The sound outputter 250 outputs sound in response to a control command of the second controller 240.

The sound outputter 250 outputs a warning sound for lane departure while the vehicle is in the keep driving mode. The sound outputter 250 may be a speaker.

The sound outputter 250 may output a display notification sound of a virtual lane.

The display 260 may display an image or turn on or turn off a light in response to a control command of the second controller 240.

The display 260 may display performance or non-execution information of the lane keeping mode, and may display information on lane departure when the lane keeping mode is being performed. The display 260 may be a lamp such as an LED or a flat panel display such as an LCD.

The display 260 may display on/off information of an operation mode associated with the lane keeping mode. In this case, the display 260 may display performance information of the lane keeping mode and performance information of the operation mode associated with the lane keeping mode together.

The display 260 may display a driving lane and a lane adjacent to the lane among the recognized lanes.

When both lane lines are recognized, the display 260 may display both the actual lane line before the adjustment and the virtual lane line after the adjustment.

When one of the two lane lines is not recognized, the display 260 may also display the recognized real lane line and the virtual lane line of the unrecognized lane line together.

In addition, the display 260 may display the actual lane line and the virtual lane line in different display methods. For example, the display 260 may display the actual lane lines and the virtual lane lines in different colors, display lines of different thicknesses, and display lines of different shapes.

The display 260 may display an object acquired by the image acquirer 210 in addition to the lane line.

The display 260 may display a top view image of the vehicle.

Figure 5:
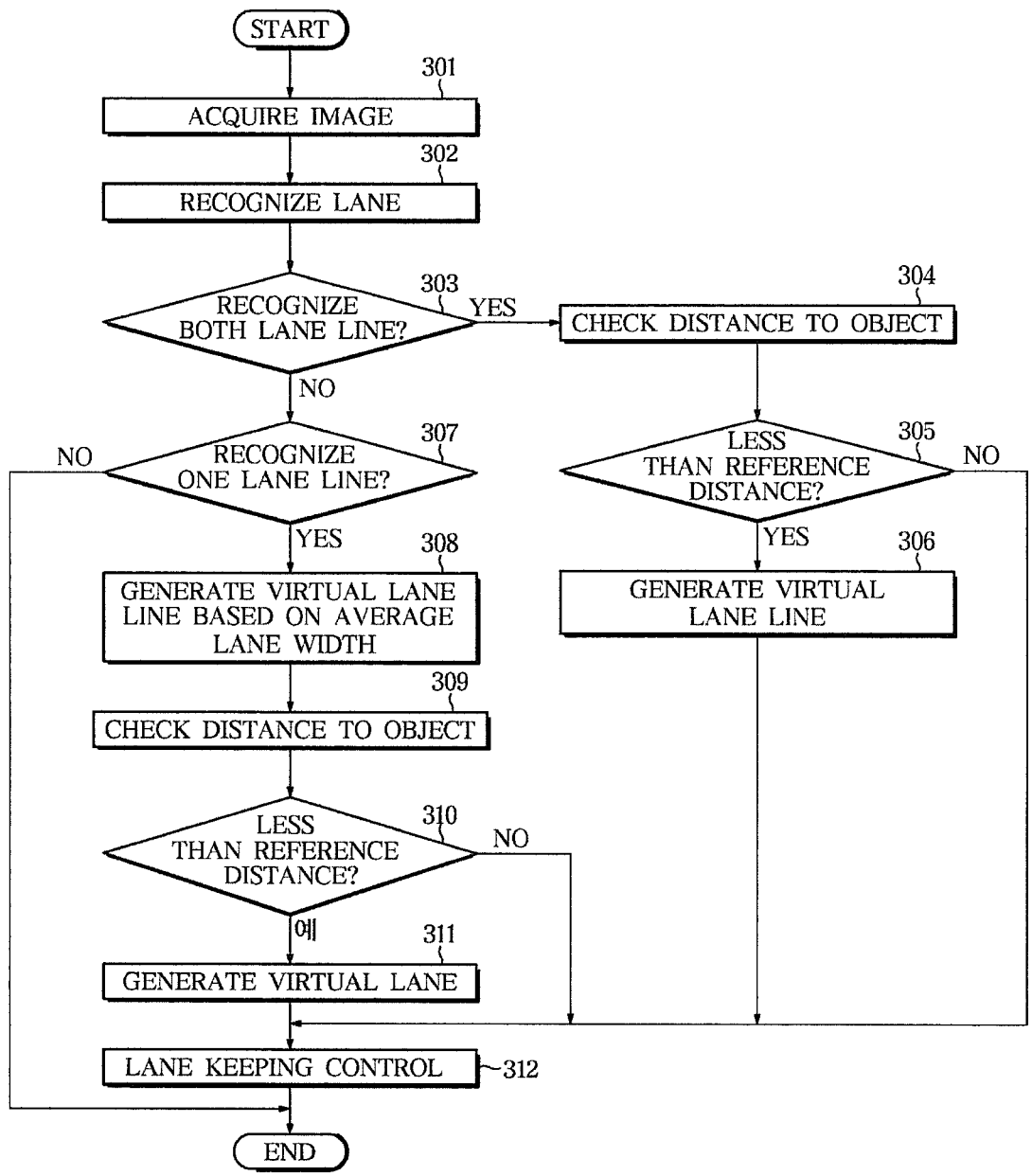
FIG. 5 is a control flowchart showing a method of controlling a lane keeping assistance apparatus provided in a vehicle according to an embodiment.

FIG. 5 is a control flowchart of a lane keeping apparatus provided in a vehicle according to an embodiment, which will be described with reference to FIGS. 6 to 15. Here, FIGS. 6 to 17 are diagrams illustrating lane generation of a lane keeping apparatus provided in a vehicle according to an exemplary embodiment.

The vehicle acquires an image of the road by activating an image acquirer while driving (301), and recognizes road image to recognize the lane of the road in the image by Image processing (302), and recognizes the own lane based on the recognized position of the lane.

In addition, the vehicle may recognize an object in the image during image processing and obtain a distance between the recognized object and the lane based on the image. The object may be at least one of a curb, a guardrail, a roadside tree, and a street lamp.

In addition, the vehicle may detect the surrounding objects by using the distance detector 220 while capturing an image of the road and obtain a distance from the detected object based on the detection information detected by the distance detector 220.

The vehicle determines whether both lanes of the own lane among the recognized lanes have been recognized (303), and if it is determined that both lanes have been recognized, the vehicle determines whether the objects exist on both the left and right sides of the own lane.

The vehicle determines whether both lane lines of the own lane among the recognized lanes have been recognized (303), and if it is determined that both lane lines have been recognized, the vehicle determines whether the objects exist on both the left and right sides of the own lane.

If it is determined that the object exists on at least one side, the vehicle checks the distance between the lane and the object in the direction in which the object exists (304). The determined distance is compared with the reference distance to determine whether the determined distance is less than or equal to the reference distance (305). When it is determined that the identified distance is less than or equal to the reference distance, the virtual lane line is generated by moving the position of the lane line in the direction in which the object exists by a predetermined distance (306).

If it is determined that the object does not exist at least on both sides, the vehicle maintains the positions of both lane lines, obtains the width of the own lane based on the positions of both lane lines, and performs road maintenance control 312.

The vehicle stores the width of the obtained car. The lane width of the own lane may be a distance between both lane lines of the own lane.

In addition, the vehicle may obtain the average lane width between the lane width stored in the storage and the currently obtained lane width and store the obtained average lane width. The vehicle may also periodically obtain the lane width and store the obtained lane width in chronological order. The vehicle may also check the recently stored preset number of lane widths among the stored lane widths, obtain the average lane width with respect to the identified preset number of lane widths, and store the obtained average lane width.

The vehicle determines whether only one lane line of both lane lines of the own lane is recognized (307), and if it is determined that both lane lines of the own lane are unrecognized, a vehicle displays a guide image for notifying the lane or recognizes lane recognition, or outputs a sound of lanes unrecognition.

When the vehicle determines that only one lane line of both lane lines of the own lane is recognized, the vehicle generates a virtual lane line in a direction in which the lane line of the two lane lines are not recognized based on the preset lane width.

The vehicle determines whether an object exists on both left and right sides of the own vehicle based on the image information corresponding to the image of the road, if it is determined that the object exists on at least one side, the distance between the lane and the object in the direction in which the object exists is checked (309). Then, comparing the checked distance with the reference distance to determine whether the determined distance is less than the reference distance (310) and if it is determined that the determined distance is less than or equal to the reference distance, a virtual lane line is generated by moving the position of the lane line in the direction in which the object exists by a predetermined distance (311) and the lane keeping control is performed 312 based on the generated position of the virtual lane line.

If it is determined that the object does not exist at least on both sides, the vehicle maintains the positions of both lane lines, obtains the width of the own lane based on the positions of both lane lines, and performs lane keeping control 312.

Here, performing the lane keeping control includes outputting a warning sound or turning on a warning light when it is determined that the vehicle has left one of both lanes of the own lane.

In addition, performing the lane keeping control may include adjusting the driving direction based on the position of the lane so that the position of the own vehicle is maintained in the own lane.

In addition, performing lane keeping control may include braking the vehicle when it is determined that an obstacle exists in the lane departure direction when the vehicle deviates the lane.

When both lane lines are recognized, the generation configuration of the virtual lane line corresponding to the presence or absence of the object will be described with reference to FIGS. 6 to 10 (corresponding to operations 303-306).

Figure 6:
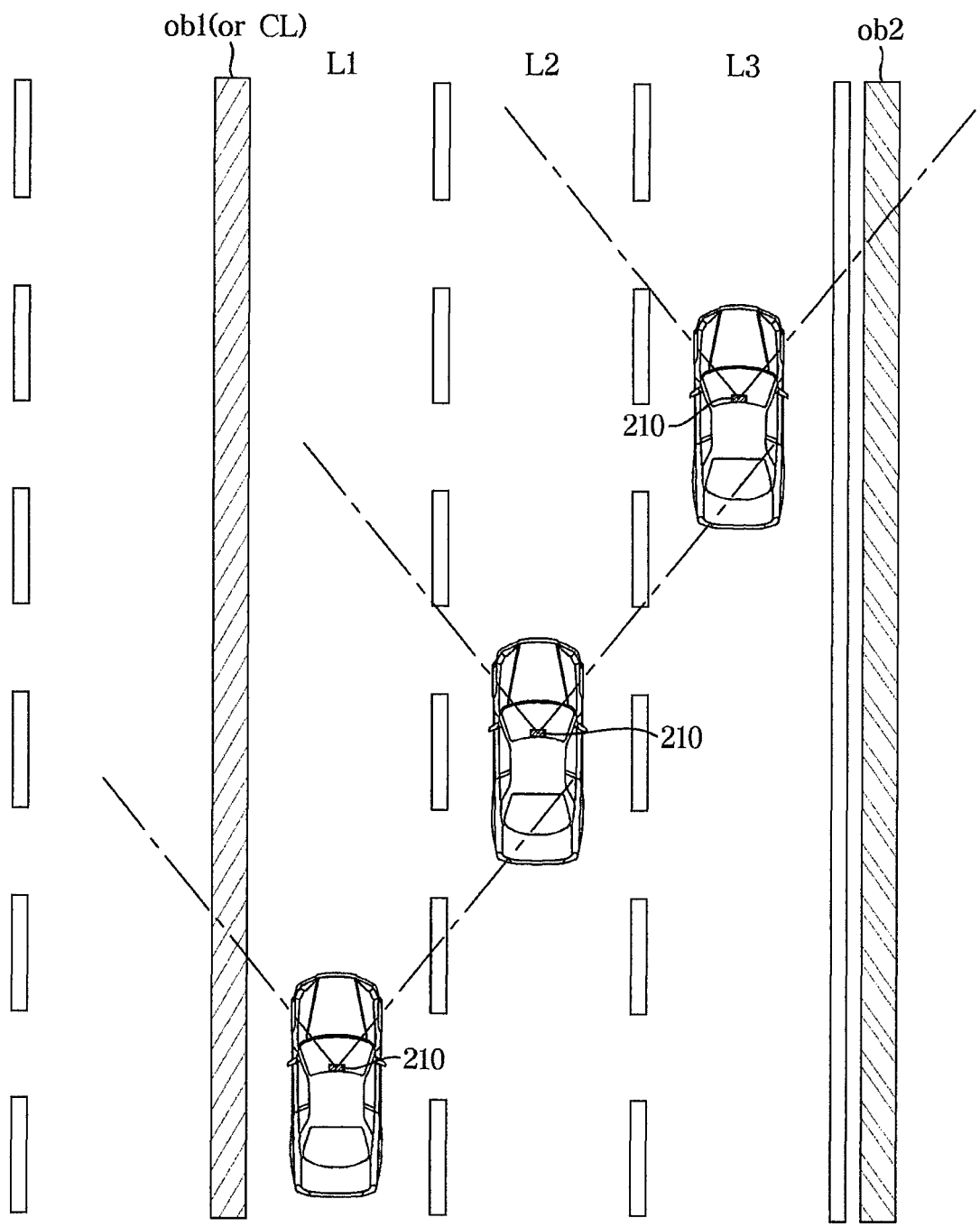
FIGS. 6 to 17 are diagrams illustrating an example in which generating a lane of a lane keeping assistance apparatus of a vehicle according to an embodiment.
Figure 7:
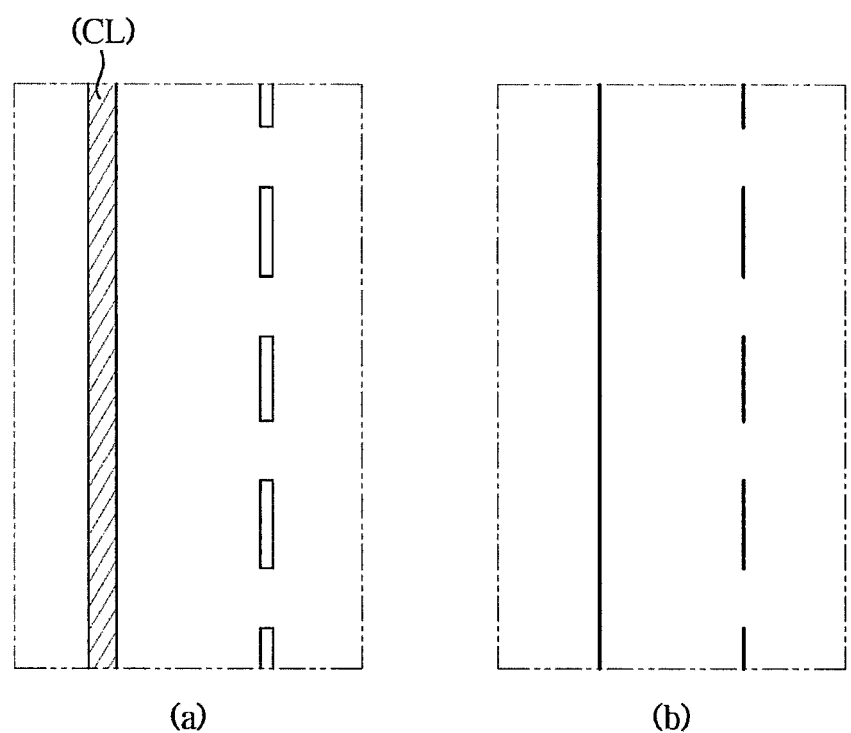

FIG. 6 shows an example of driving in the first lane L1 without damaging the lane, driving in the second lane L2 without damaging the lane, and driving in the third lane L3 without damaging the lane. When driving in the first lane, the vehicle may have an object ob1 such as a center line (CL), a guard rail, a street tree or a street lamp on the left side, and when driving in the third lane (L3), the vehicle may have an object ob2 such as a curb, a roadside tree, or a street light may exist on the right side of the vehicle.

FIG. 7A is an image captured by the image acquisition unit 210 of a vehicle traveling in the first lane L1, and the image may include an image of a center line on the left side of the own lane and a right lane image.

FIG. 7A is an image captured by the image acquirer 210 of a vehicle traveling in the first lane L1, and the image may include an image of a center line on the left side of the own lane and a right lane image.

As shown in FIG. 7B, the vehicle may perform image processing, recognize the center line on the left side, and recognize the lane on the right dotted line as an image processing result.

FIG. 8A illustrates an image captured by the image acquirer 210 of a vehicle traveling in the first lane L1, and the image may include an object ob1 image and a right lane image on the left side of the own lane.

Figure 8:
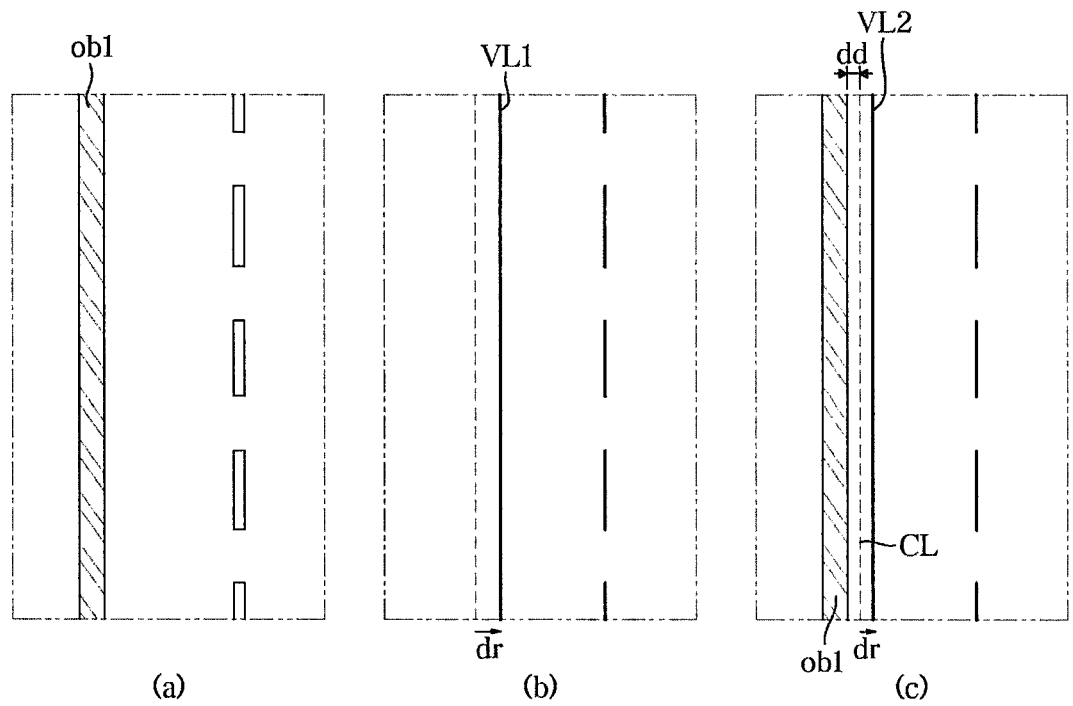

As shown in (b) of FIG. 8, the vehicle may perform image processing and recognize a lane of an object on the left side and a dotted line on the right side as a result of the image processing. At this time, the vehicle generates the virtual lane line VL1 at a position moved by a predetermined distance dr from the position of the object ob1 on the left side.

In addition, the vehicle driving in the first lane L1 may acquire an image including an object ob1 image and a center line CL image and a lane image on the right side of the own lane.

As shown in FIG. 8C, the vehicle may perform image processing, recognize an object on the left side and a center line as a result of the image processing, and recognize a lane of a dotted line on the right side.

At this time, the vehicle acquires the distance dd between the position of the object ob1 on the left side and the position of the center line CL, and maintains the position of the center line CL when the obtained distance exceeds the reference distance. If the acquired distance is less than or equal to the reference distance, the virtual lane VL2 is generated at a position moved by the preset distance dr from the position of the center line.

Figure 9:
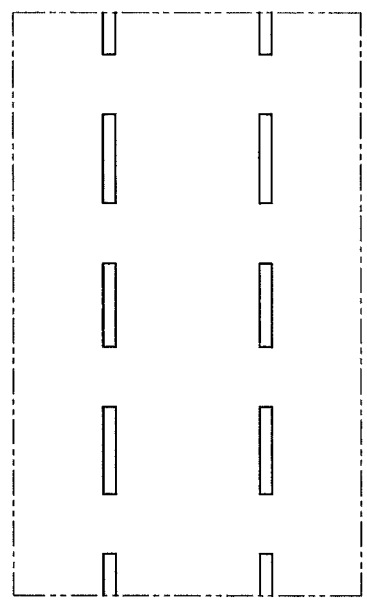
Figure 9:
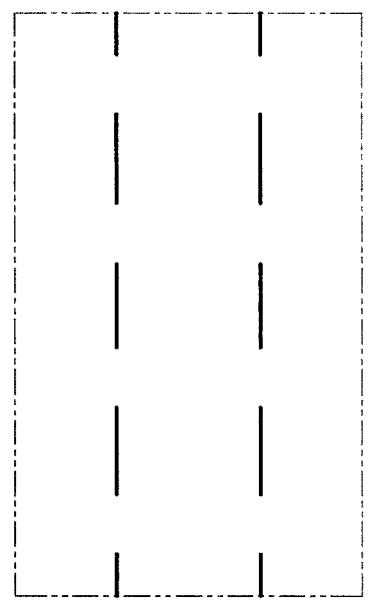

FIG. 9 (a) is an image captured by the image acquirer 210 of a vehicle traveling in the second lane L2, and the image may include a lane image on the left side and a lane image on the right side of the own lane.

As shown in FIG. 9(b), the vehicle may perform image processing and recognize the lane of the dotted line on the left and the lane of the dotted line on the right as a result of the image processing.

That is, the vehicle may maintain the positions of both lanes unless the driving lane is the first lane and the last lane on the right.

Figure 10:
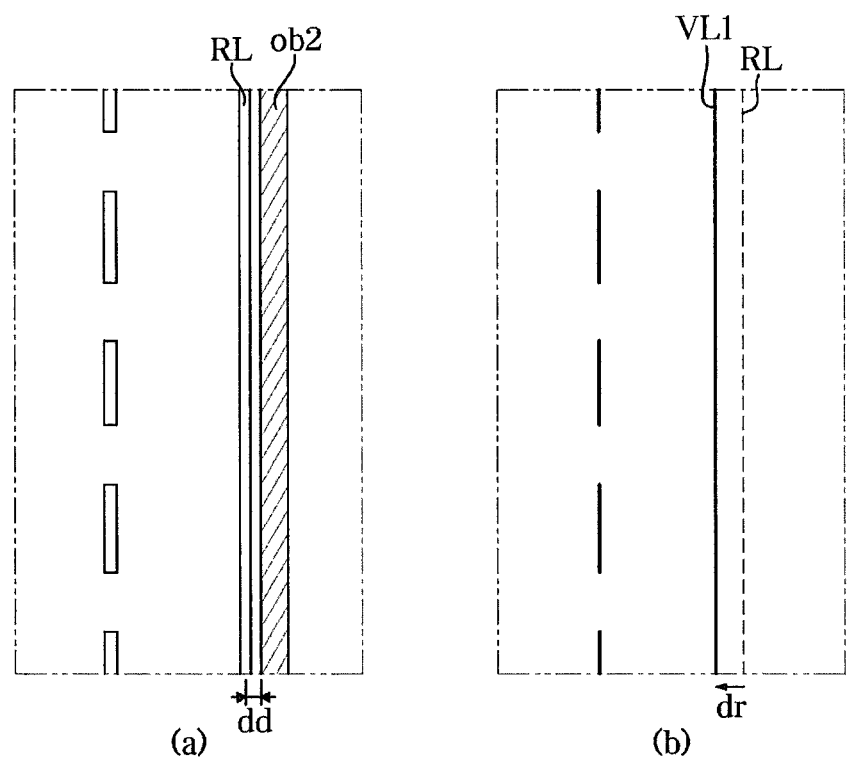

FIG. 10 (a) is an image captured by the image acquirer 210 of a vehicle traveling in the third lane (L3), the image is a lane image of the left side of the own lane, and may include the object ob2 and the lane image of the right side.

As shown in FIG. 10 (b), the vehicle may perform image processing and recognize the left dotted line lane and the right object and lane as the image processing result.

At this time, the vehicle acquires the distance dd between the position of the object ob2 on the right side and the position of the right lane line, and if the acquired distance exceeds the reference distance, the position of the right lane line RL is maintained, and if the acquired distance is less than or equal to the reference distance, the virtual lane VL1 is generated at a position moved by a preset distance dr from the position of the right lane line.

That is, the vehicle may adjust the position of the recognized lane line based on the distance from the left or right object when the driving lane line is the first lane or the last lane on the right. In this case, the vehicle may generate and acquire a virtual lane.

When only one lane line of both lane lines is recognized, a generation configuration of the virtual lane line corresponding to the existence of the virtual lane line and the object for the other lane line will be described with reference to FIGS. 11 to 15 (operations 307-311).

Figure 11:
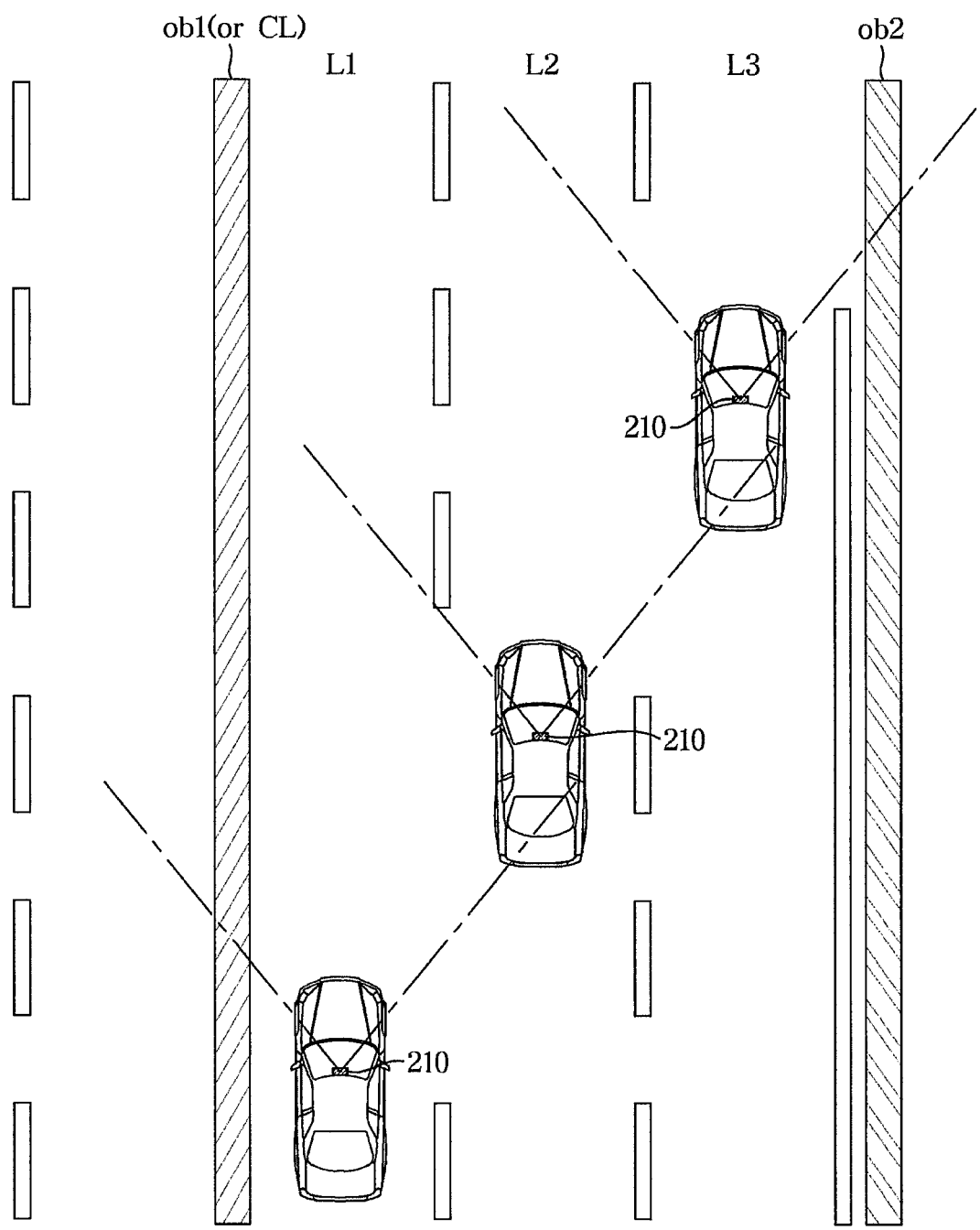

FIG. 11 is an exemplary diagram of driving in a first lane L1 in which a lane is damaged, driving in a second lane L2 in which a lane is damaged, and driving in a third lane L3 in which a lane is damaged. When driving in the first lane L1, an object ob1 such as a center line (CL), a guard rail, a roadside tree, or a street lamp may exist on the left side, and the vehicle when driving in the third lane L3, an object ob2 such as a curb, a roadside tree or a street light may exist on the right side.

Figure 12:
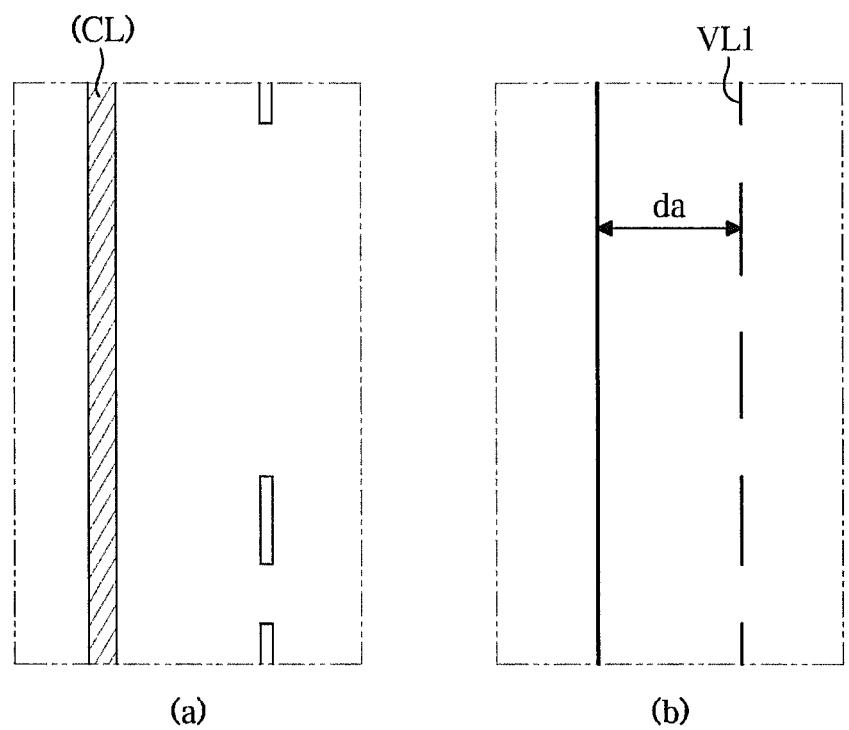

FIG. 12 (a) is an image captured by the image acquirer 210 of the vehicle traveling in the first lane L1, and the image may include only an image of the center line on the left side of the own lane. At this time, the lane on the right side cannot be obtained as an image due to damage.

As shown in FIG. 12 (b), the vehicle may perform image processing and recognize the left center line as a result of the image processing. Accordingly, the vehicle generates the virtual lane line VL1 on the right side at the position shifted by the predetermined lane width da from the recognized center line position. Through this, the vehicle may acquire the lane line on the right side.

Figure 13:
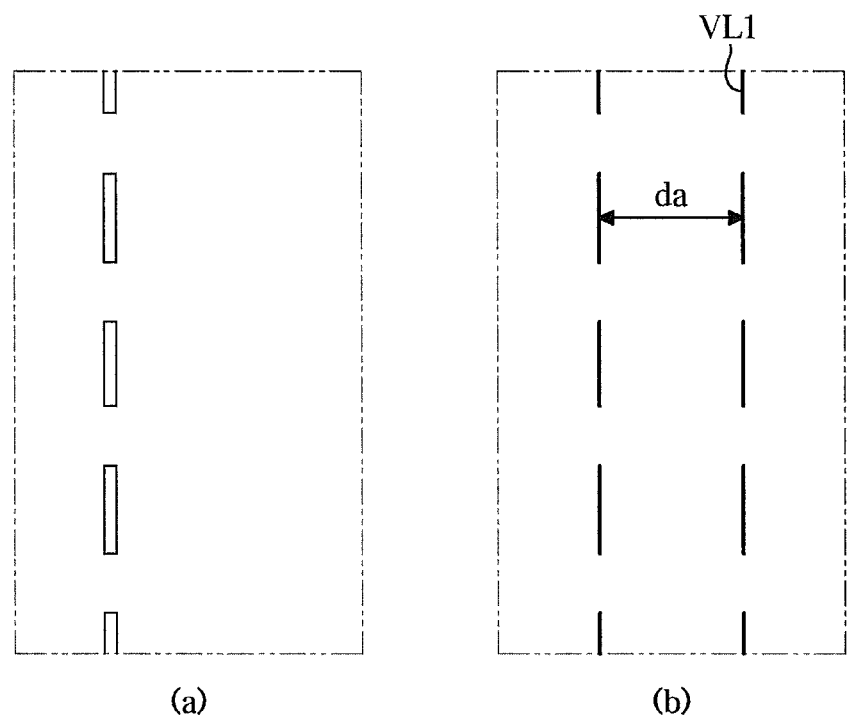

FIG. 13 (a) illustrates an image captured by the image acquirer 210 of a vehicle traveling in the second lane L2, and the image may include only the Lane image on the left side of the own lane. At this time, the lane line on the right side cannot be obtained as an image due to damage.

As shown in FIG. 13 (b), the vehicle may perform image processing and recognize only the lane of the dotted line on the left as an image processing result. Accordingly, the vehicle generates the virtual lane line VL1 on the right side at the position shifted by the predetermined lane width da from the recognized left lane position. Through this, the vehicle may acquire the lane line on the right side.

Figure 14:
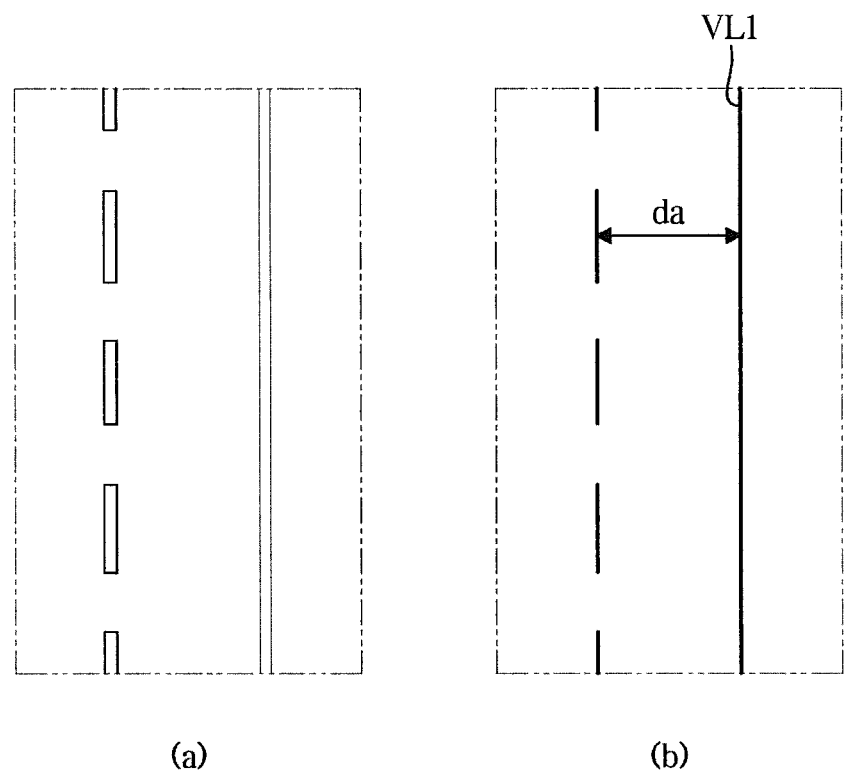
Figure 15:
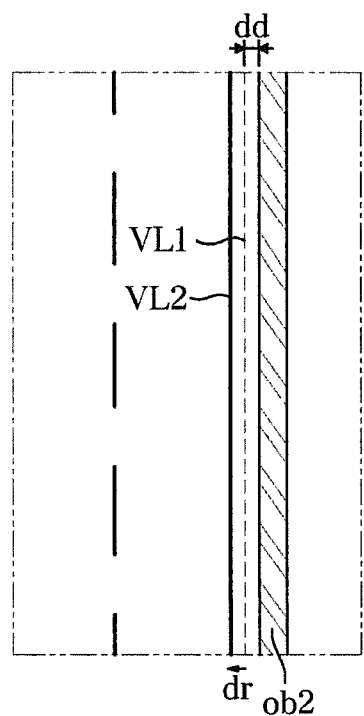

FIG. 14 (a) illustrates an image captured by the image acquirer 210 of a vehicle traveling in the third lane L3, and the image may include a lane image on the left side of the own lane and an object ob2 image on the right side.

As shown in FIG. 14 (b), the vehicle may perform image processing and recognize the left dotted lane line and the right object as the image processing result. Accordingly, the vehicle generates the virtual lane VL1 on the right side at the position shifted by the predetermined lane width da from the recognized left lane position. Through this, the vehicle may acquire the lane line on the right side.

In addition, the vehicle obtains the distance dd between the position of the object ob2 on the right side and the position of the virtual lane VL1 on the right side, and maintains the position of the virtual lane VL1 when the acquired distance exceeds the reference distance. If the distance is less than or equal to the reference distance, the virtual lane line VL2 is generated at a position moved by the preset distance dr from the position of the virtual lane line VL1.

Figure 16:
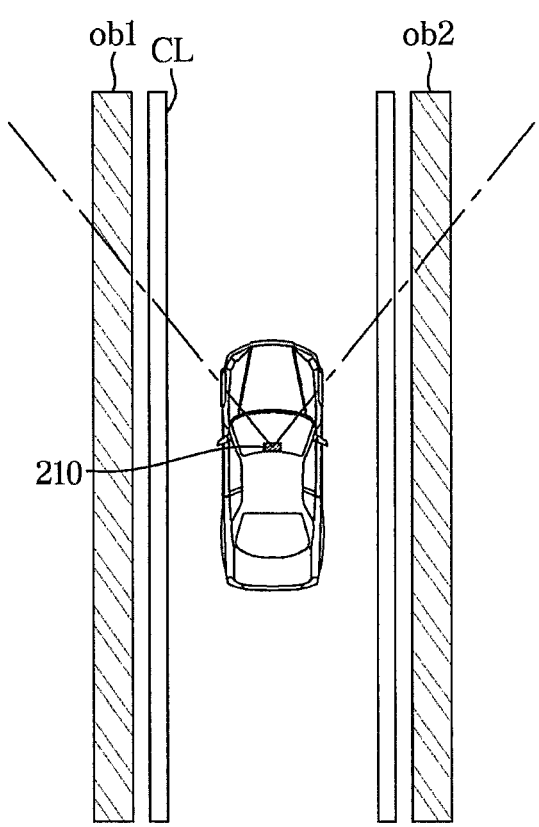

FIG. 16 is an exemplary view of driving of a vehicle when traveling on a road in which a guard rail ob1 is present on the left side and curbs ob2 are present on the right side.

As shown in FIG. 17(a), the image acquired by the image acquirer of the vehicle includes a guardrail image ob1 on the left side of the vehicle lane, a lane image on the left side, and a curb image ob2 on the right side and a lane image of the right side.

Figure 17:
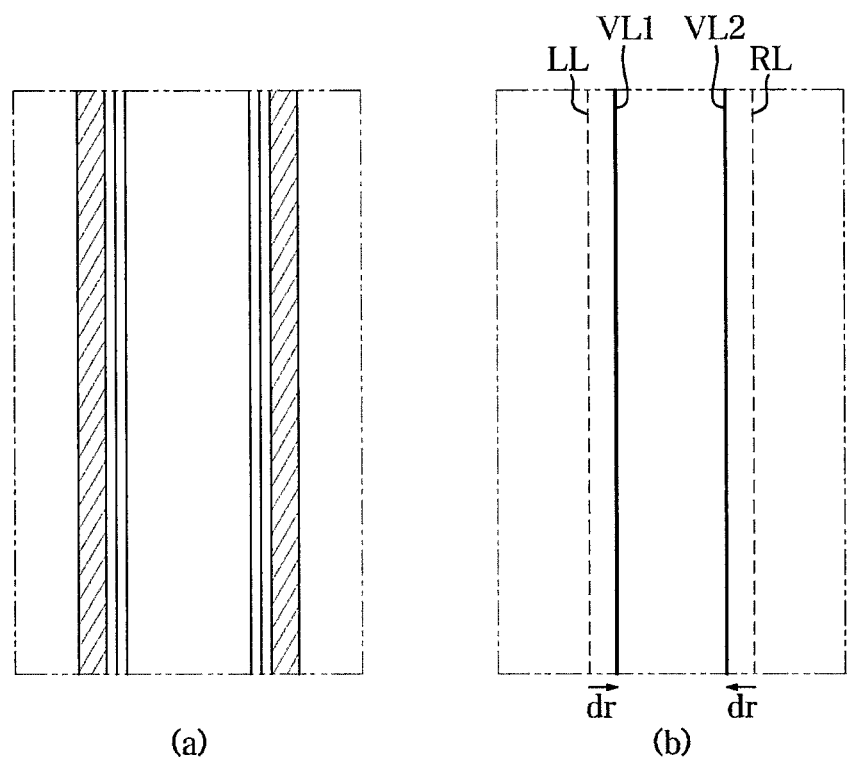

As shown in FIG. 17 (b), the vehicle may perform image processing and recognize a guardrail and a lane on the left side and a curb and a lane on the right side as a result of the image processing.

At this time, the vehicle acquires the distance dd between the position of the left guardrail ob1 and the position of the left lane, and if the acquired distance exceeds the reference distance, the position of the left lane LL is maintained, and if the acquired distance is less than or equal to the reference distance, the virtual lane VL1 is generated at a position moved by a preset distance dr from the position of the left lane.

And the vehicle acquires the distance dd between the position of the right object ob2 and the position of the right lane, and if the acquired distance exceeds the reference distance, the position of the right lane RL is maintained, and if the acquired distance is less than or equal to the reference distance, the virtual lane VL2 is generated at a position moved by a preset distance dr from the position of the right lane.

In addition, if the vehicle has a distance (dd) between the position of the left guard rail (ob1) and the position of the left lane is less than the reference distance, If the distance dd between the position of the right object ob2 and the position of the right lane is less than or equal to the reference distance, it is also possible to create only the virtual lanes for any one of the left lane and the right lane.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

The present disclosure can minimize the discomfort received by the driver by adjusting the position of the lane in the image based on the distance from the object such as curb or guardrail of the road.

According to the present disclosure, if a lane is not recognized in an acquired image, a virtual lane is generated based on an average lane width, and a warning about lane departure determination and lane departure is performed based on the generated virtual lane, thereby providing accuracy for lane departure determination to increase the reliability of lane departure warnings.

Accordingly, the present disclosure can prevent collisions with other vehicles, improve driving stability, and lower the driver's tension while driving.

As described above, the present disclosure can improve usability, quality, and merchandise of the vehicle maintenance apparatus and the vehicle, and further increase the satisfaction of the user and secure the competitiveness of the product.

DESCRIPTION OF SYMBOLS

1: vehicle
100: driver assistance system
110: front camera
120: front radar
130: corner radars
131: first corner radar
132: second corner radar
133: third corner radar
134: fourth corner radar
140: first controller
200: lane keeping assistance apparatus
240: second controller

What is claimed is:

1. A lane keeping assistance apparatus, comprising,
an image acquirer configured to acquire an image of a road; and
a controller configured to recognize lane lines and objects of a road based on the image acquired by the image acquirer, recognize a driving lane based on the recognized lane lines, generate the other lane line based on a preset lane width when only one lane line of the recognized lane is recognized, adjust a lateral position of the generated one lane line based on a preset distance when a distance between the recognized object and the generated one lane line is equal to or less than a reference distance, and perform at least one of lane departure prevention control and lane keeping control based on the adjusted position of the lane line and the recognized position of the lane line,
wherein the controller maintains the position of the generated one lane line when the distance between the recognized object and the generated one lane line is more than the reference distance, and performs at least one of the lane departure prevention control and lane keeping control based on the position of the generated one lane line and the recognized lane line, and the recognized object is located at or outside the generated one lane line of the driving lane.

2. The lane keeping assistance apparatus of claim 1, wherein the controller adjusts the position of the recognized one lane line based on the preset distance when the distance between the recognized object and the recognized one lane line is equal to or less than the reference distance, and maintains the position of the recognized one lane line based on the preset distance when the distance between the recognized object and the recognized one lane line is more than the reference distance.

3. The lane keeping assistance apparatus of claim 2, wherein the controller, when adjusting the position of the recognized lane line or the generated lane line, moves the lane line to the left for position adjustment by the preset distance if the recognized object exists on right side of the recognized lane line, and moves the lane line to the right for position adjustment by the preset distance if the recognized object exists on left side of the recognized lane line.

4. The lane keeping assistance apparatus of claim 1, the controller maintains the position of the recognized lane lines when both lane lines of the recognized lane are recognized.

5. The lane keeping assistance apparatus of claim 4, the controller acquires a distance between the recognized object and the both lane lines respectively, and adjusts the position of the lane line that is less than or equal to the reference distance among the acquired distances.

6. The lane keeping assistance apparatus of claim 5, wherein the controller, when adjusting the position of the lane line that is less than or equal to the reference distance, moves the lane line to the left by the preset distance if the recognized object exists on right side of the recognized lane line, and moves the lane line to the right by the preset distance if the recognized object exists on left side of the recognized lane line.

7. A vehicle comprising:
an image acquirer configured to acquire an image of a road; and
a controller configured to recognize both lane lines of a driving lane and objects based on the image acquired by the image acquirer, and perform at least one of lane departure prevention control and lane keeping control based on position of the recognized both lane lines and objects, wherein
the controller generates the other lane line based on a preset lane width when only one lane line of the recognized lane is recognized, adjust a lateral the position of the generated one lane line based on a preset distance when a distance between the recognized object and the generated one lane line is equal to or less than a reference distance, maintains the position of the generated one lane line when the distance between the recognized object and the generated one lane line is more than the reference distance, acquires a distance between the recognized object and the both lane lines respectively, and adjusts the position of the lane line that is less than or equal to the reference distance among the acquired distances, and maintains the position of the both lane lines when the acquired distances both are more than the reference distance, and
the recognized object is located at or outside the generated one lane line of the driving lane.

8. The vehicle of claim 1,
wherein the controller, when adjusting the position of the generated lane line, moves the generated lane line to the left by the preset distance if the recognized object exists on right side of the generated lane line, and moves the generated lane line to the right by the preset distance if the recognized object exists on left side of the generated lane line.

9. The vehicle of claim 7,
wherein the controller generates the other lane line based on the preset lane width when only one lane line of lane is recognized, and performs at least one of lane departure prevention control and lane keeping control based on the position of the generated one lane line and the recognized one lane line.

10. The vehicle of claim 7, further comprising:
a sound outputter configured to output a warning sound when one of the both lane lines of the lane deviates the lane in response to a control command of the controller.

11. The vehicle of claim 7, further comprising:
a display configured to turn on a warning light when one of the both lanes of the lane lines deviates the lane in response to a control command of the controller.

12. The vehicle of claim 7, further comprising:
a steering device configured to control a driving direction to drive in the lane in response to a control command of the controller.

13. A method for controlling a lane keeping assistance apparatus, the method comprising:
acquiring an image of a road;
recognizing lane lines and objects of a road based on the acquired image;
recognize a driving lane based on the recognized lane lines;
generating the other lane line based on a preset lane width when only one lane line of the recognized lane is recognized;
adjusting a lateral position of the generated one lane line based on a preset distance when a distance between the recognized object and the generated one lane line is equal to or less than a reference distance,
performing at least one of lane departure prevention control and lane keeping control based on the adjusted position of the lane line and the recognized position of the lane line;
maintaining the position of the generated one lane line when the distance between the recognized object and the generated one lane line is more than the reference distance; and
performing at least one of the lane departure prevention control and lane keeping control based on the position of the maintained one lane line and the recognized lane line,
wherein the recognized object is located at or outside the generated one lane line of the driving lane.

14. The method of claim 13, further comprising:
adjusting the position of the recognized one lane line based on the preset distance when the distance between the recognized object and the recognized one lane line is equal to or less than the reference distance; and
maintaining the position of the recognized one lane line based on the preset distance when the distance between the recognized object and the recognized one lane line is more than the reference distance.

15. The method of claim 13, further comprising:
recognizing the object on a left side when the recognized lane is a primary lane;
adjusting the position of a center line by the preset distance to the right when the distance between the recognized object and the center line is less than or equal to the reference distance;
recognizing the object on a right side when the recognized lane is the last lane on the right side;
adjusting a right lane to the left by the preset distance when the distance between the recognized object and the right lane is less than the reference distance.

* * * * *